US011243867B1

(12) United States Patent
Wexler et al.

(10) Patent No.: US 11,243,867 B1
(45) Date of Patent: Feb. 8, 2022

(54) SYSTEM FOR FEDERATED GENERATION OF USER INTERFACES FROM A SET OF RULES

(71) Applicant: AMAZON TECHNOLOGIES, INC., Seattle, WA (US)

(72) Inventors: Michael Carey Wexler, Mountain View, CA (US); Vignesh Lakshminarayanan, Bothell, WA (US); Vinod Murali, Bellevue, WA (US); Leonardo Maia Carneiro De Novaes, Vancouver (CA); Gerasimos Arvanitis, Seattle, WA (US); Calvin Daniel Freitas, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 422 days.

(21) Appl. No.: 16/213,858

(22) Filed: Dec. 7, 2018

(51) Int. Cl.
*G06F 11/36* (2006.01)
*G06F 16/958* (2019.01)
*G06F 8/38* (2018.01)

(52) U.S. Cl.
CPC ............ *G06F 11/3616* (2013.01); *G06F 8/38* (2013.01); *G06F 11/366* (2013.01); *G06F 11/3664* (2013.01); *G06F 16/958* (2019.01)

(58) Field of Classification Search
CPC .................. G06F 8/38; G06F 11/3616; G06F 11/366–3664; G06F 16/958
See application file for complete search history.

(56) References Cited

U.S. PATENT DOCUMENTS

| 6,327,618 | B1 | 12/2001 | Ahlstrom et al. |
| 7,216,298 | B1 | 5/2007 | Ballard et al. |
| 7,613,726 | B1 | 11/2009 | Spivak et al. |
| 8,166,155 | B1 | 4/2012 | Rachmeler et al. |
| 9,712,331 | B1 | 7/2017 | Poh et al. |
| 9,933,929 | B1 * | 4/2018 | Pitsillides ........... G06F 3/04842 |

(Continued)

OTHER PUBLICATIONS

Nakamura et al., "A Dynamic Rearrangement Mechanism of Web Page Layouts Using Web Agents", published by Springer-Verlag Berlin Heidelberg 2009, pp. 634-643 (Year: 2009).*

(Continued)

*Primary Examiner* — S. Sough
*Assistant Examiner* — Zheng Wei
(74) *Attorney, Agent, or Firm* — Lindauer Law, PLLC

(57) ABSTRACT

Techniques for modifying a user interface in which respective elements are presented if the criteria for those elements are satisfied include receiving criteria and element characteristics for a new or modified user interface element. The criteria for the new or modified element are compared to criteria for existing elements to determine other elements that could be presented contemporaneously if a request satisfying multiple sets of criteria is received. For each element with corresponding criteria, the characteristics of the element are compared to those of the new or modified user interface element to determine whether the sets of characteristics are mutually exclusive. If the characteristics are mutually exclusive, a conflict exists and information regarding the author of the existing element and the goal or rationale associated with the element may be provided to the user attempting to modify the user interface.

20 Claims, 8 Drawing Sheets

(56) References Cited

U.S. PATENT DOCUMENTS

| | | | |
|---|---|---|---|
| 2003/0217332 A1 | 11/2003 | Smith et al. | |
| 2005/0268239 A1 | 12/2005 | Seshadri | |
| 2006/0036945 A1 | 2/2006 | Radtke et al. | |
| 2006/0041842 A1* | 2/2006 | Loberg | G06T 15/00 715/700 |
| 2009/0327925 A1* | 12/2009 | Smet | G06F 9/454 715/762 |
| 2012/0066620 A1* | 3/2012 | Teng | G06N 5/025 715/762 |
| 2012/0124492 A1* | 5/2012 | Taron | G06F 9/451 715/762 |
| 2012/0151329 A1* | 6/2012 | Cordasco | G06F 11/3006 715/234 |
| 2012/0198364 A1* | 8/2012 | Bornheimer | G06F 8/38 715/762 |
| 2013/0067322 A1 | 3/2013 | Gould et al. | |
| 2013/0167028 A1 | 6/2013 | Goldman et al. | |
| 2013/0227078 A1 | 8/2013 | Wei et al. | |
| 2014/0082476 A1 | 3/2014 | Lundqvist et al. | |
| 2014/0280515 A1 | 9/2014 | Wei et al. | |
| 2015/0039996 A1 | 2/2015 | Kwon | |
| 2015/0142934 A1 | 5/2015 | Craine et al. | |
| 2015/0324490 A1 | 11/2015 | Page | |
| 2015/0378575 A1* | 12/2015 | Kaplinger | G06F 9/451 715/760 |
| 2016/0085430 A1* | 3/2016 | Moran | G06F 9/451 715/765 |
| 2016/0124618 A1* | 5/2016 | Bostick | G06F 9/44 715/790 |
| 2017/0337321 A1* | 11/2017 | Hoford | G06F 8/38 |
| 2018/0121560 A1* | 5/2018 | Chen | G06K 9/00442 |

OTHER PUBLICATIONS

Mahajan et al., "Visual and Textual Consistency Checking Tools for Graphical User Interfaces", published by IEEE Transactions on Software Engineering, vol. 23, No. 11, Nov. 1997, pp. 722-735 (Year: 1997).*

Bowen, Richard L., "Final Office Action dated Jun. 18, 2020", U.S. Appl. No. 15/608,714, The United States Patent and Trademark Office, dated Jun. 18, 2020.

Bowen, Richard L., "Non-final Office Action dated Dec. 19, 2019", U.S. Appl. No. 15/608,714, The United States Patent and Trademark Office, dated Dec. 19, 2019.

Bowen, Richard L, "Non-final Office Action dated Oct. 2, 2020", U.S. Appl. No. 15/608,714, The United States Patent and Trademark Office, dated Oct. 2, 2020.

Bowen, Richard L., "Notice of Allowance dated Feb. 24, 2021", U.S. Appl. No. 15/608,714, The United States Patent and Trademark Office, dated Feb. 24, 2021.

* cited by examiner

SYSTEM FOR FEDERATED GENERATION OF USER INTERFACES FROM A SET OF RULES

BACKGROUND

Webpages and other types of user interfaces may include various elements that are presented based on various characteristics of a session, such as characteristics of a device accessing the webpage, characteristics of a network connection, the characteristics of a user accessing the webpage, or the characteristics of the content included in the webpage. In some cases, different elements of a user interface may be generated by different users, sometimes without the knowledge of other users. In such cases, when a user attempts to create or modify a user interface element, this action may conflict with an existing element generated by another user. Resolution of such conflicts may be difficult in cases where users responsible for existing elements and the goals or rationales associated with the existing elements are not known to a user attempting to modify a user interface.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
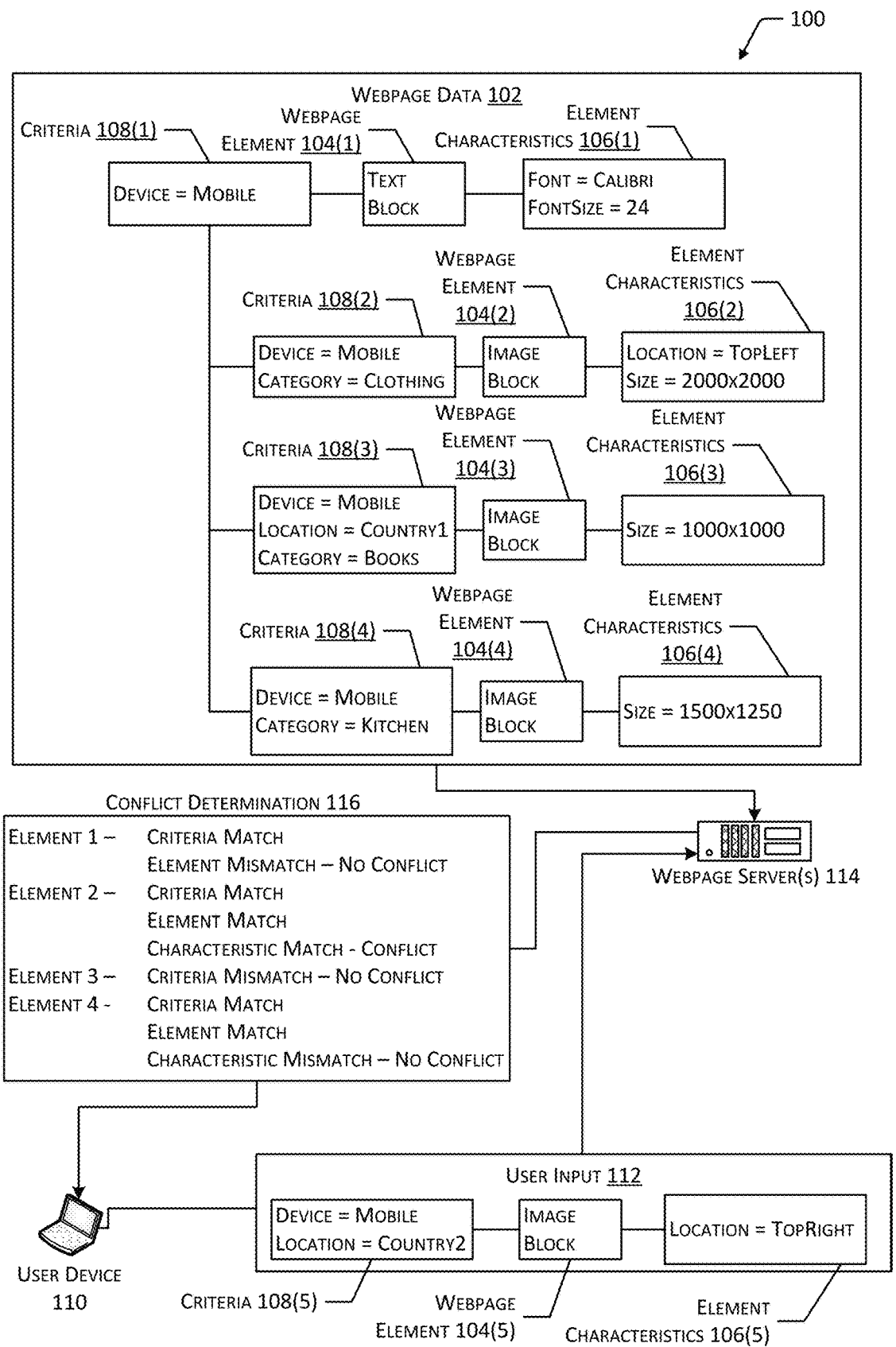
FIG. 1 depicts an implementation of a system for enabling a user to add or modify elements within a webpage or other user interface and determine conflicts between existing elements and a new or modified element.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Webpages and other types of user interfaces may use multiple types of elements to communicate information to users. For example, a webpage associated with an online store may include elements used to communicate features of an item available for purchase, such as images of the item, an item name, descriptive text, an item price, and so forth. Each element of a user interface may be defined by multiple characteristics, such as the dimensions, location, font, color, or shape of the element. In most cases, the elements presented in a webpage are determined based on program code, such as HyperText Markup Language (HTML) code. For example, a developer, programmer, manager, or other type of user seeking to add an element to a webpage or modify an existing element would typically be required to modify the code associated with the webpage. User interface elements associated with other types of user interfaces, such as mobile device systems, may include widgets and other types of native content. In some cases, different user interface elements, or different characteristics of user interface elements, may be configured for output based on certain circumstances associated with a request to access the user interface. For example, if a request is received from a mobile device, a particular arrangement and set of elements suitable for view on a mobile device may be included in a user interface provided in response to the request, while a different set and arrangement of elements may be provided in response to a request from a desktop browser. As another example, a user interface associated with a first type of content, such as clothing sales, may include an arrangement of elements that differs from a user interface associated with a second type of content, such as video game sales. As yet another example, a user interface associated with a first set or arrangement of elements may be provided in response to a request associated with sale of items in one country, while a user interface associated with a second set or arrangement of elements may be provided in response to a request associated with sale of items in a different country. Different arrangements of elements may be combined based on the characteristics of a request to access a user interface. For example, a request to access a webpage associated with video game sales in one country may include elements associated with both criteria.

Described in this disclosure are techniques for enabling the generation and modification of webpages and other types of user interfaces that are defined by a set of rule criteria associated with corresponding elements. For example, when a request to access a user interface is received, criteria associated with the request, such as a type of user device or browser application used, a latency associated with the network connection, a location from which the request originates, elements of the webpage's URL or other types of user interface identifiers, or the content of the user interface to be presented may be determined. Then, correspondence between the request criteria and the criteria associated with a body of user interface elements may be used to determine a particular set of elements and element characteristics to be included in a user interface generated in response to the request. For example, a different set or arrangement of elements may be provided in response to a request associated with a mobile device, video elements may be omitted from presentation if latency exceeds a threshold, enlarged images may be used in association with sale of apparel, certain content may be included or omitted based on the location of the request, and so forth.

When a developer, programmer, manager, or other type of user attempts to modify an existing element, add a new element to a user interface, or generate a new user interface, the user may provide various criteria associated with the element and its characteristics, such that if the criteria are satisfied, the element will be presented with the associated characteristics. However, the modification of a user interface in this manner may conflict with one or more existing elements. For example, if an existing user interface element is configured to be presented in response to the same or similar conditions and is associated with characteristics that are mutually exclusive with the new or modified element provided by the user, it may not be possible to generate a user interface that includes both elements.

In some implementations, a user interface may be presented to a user attempting to modify or add an element to a webpage or other type of user interface. The user may provide user input indicating the criteria associated with the element to be modified or added. For example, a user may provide user input indicating that the element to be added relates to output of webpages providing information regarding items available for sale on mobile devices in a particular country. Correspondence between the user input criteria and the criteria associated with existing elements may be determined, and a list of webpages that correspond to the user input criteria may be presented to the user. The user may then select a particular webpage to be modified, and a user interface indicating the elements included in the webpage may be presented. User input provided to the user interface may be used to modify the characteristics of an existing element, modify the arrangement of existing elements, modify the criteria associated with a particular element or characteristic that may cause the element or characteristic to be presented, or add a new element. Each modification input by the user may be stored in association with a user identifier indicative of the user and other metadata, such as the time of modification. In some implementations, the user may also input text or other data indicating the goal or reason associated with the addition or modification of an element, such as an attempt to induce a larger number of sales in a particular region or to minimize returns.

After a user has provided user input adding or modifying a user interface element, the criteria associated with the added or modified user interface element may be compared with the criteria for existing user interface elements. If the criteria for the added or modified element match at least a subset of the criteria for an existing element in a manner that may cause both elements to be presented contemporaneously, a conflict between the two elements may exist. In such a case, the content of the two elements and their characteristics may also be compared to determine possible conflicts that would prevent both elements from being presented. For example, a user input modification may indicate a first font for the title of a webpage, while an existing element indicates a second font. In such a case, a conflict would exist, because both fonts may not be used in the same element. Conversely, if the user input indicates a font while the existing element indicates a location for the title without specifying a font, both characteristics could be presented without conflict. As another example, a user input modification may indicate a first location for an element, but an existing user interface layout may include a different element at the first location, such that both elements may not be presented contemporaneously.

If a conflict is determined to exist, output may be generated indicating the existing element with which the user input conflicts, and in some cases, the user associated with the existing element and any data indicative of the goal or reason associated with the existing element. In such a case, a user providing a new element or modification may modify the element in a manner that avoids a conflict, contact the user associated with the existing element to suggest a modification, and so forth. In some implementations, a conflict between multiple elements may be resolved automatically. For example, if a first element is associated with a performance metric, such as increased revenues, profit, conversion rate, user interactions, and so forth that exceeds a threshold amount, the first element may be included in a webpage, and a conflicting element excluded, automatically, without requiring user input.

As one skilled in the art will appreciate in light of this disclosure, certain embodiments may be capable of achieving certain advantages, including some or all of the following: generation of a webpage or other type of user interface based on rules and criteria associated with elements may enable the content and arrangement of a user interface to be flexibly and dynamically generated based on the characteristics of a request, without requiring multiple different versions of a user interface to be programmed. Additionally, storage of webpage elements in association with the criteria that cause the elements to be included in a webpage may reduce the amount of data that is stored, such as by enabling individual elements to be stored rather than different versions of webpages that include different combinations of elements. Use of a user interface that determines existing user interface layouts based on criteria may enable a user seeking to create or modify a user interface for a particular purpose to quickly locate existing elements that are presented when the user input criteria are satisfied. Automatic determination of conflicting elements in response to user input adding or modifying an element may enable a user to resolve such a conflict, either by modifying an element or contacting users responsible for existing elements. Additionally, resolution of such conflicts may prevent a user interface from being output with conflicting elements, which may consume computational resources, such as those associated with a user's attempt to reload a requested webpage, and may result in a negative user experience. Further, automatic use of a selected element based on external factors, such as revenue, contribution profit, units sold, conversion rate, user interactions, business goals, or legal requirements may enable a conflict to be resolved without user intervention, or for a particular element to be used until a user is able to manually resolve a conflict. Uses of a system to identify and in some cases, resolve conflicts, may enable a group of users, including users that may be unaware of one another, to develop a user interface or particular elements within a user interface. As a result, development of a webpage or other user interface may not necessarily require a single person or team that is aware of all of the underlying code for a webpage, but may instead be performed in a distributed manner by multiple users.

Additionally, certain embodiments may include use of a simplified development user interface that facilitates the development of webpages and other types of user interfaces in a distributed manner by multiple users. The simplified user interface may present a limited list of common functions and commonly accessed data used to add, remove, move, or modify user interface elements, which may be accessed directly from a developer's browser or other application. The speed of a user's navigation through various views and pages associated with development of a webpage may be improved by enabling a user to perform a function directly using the user interface, rather than navigating to other pages or data of interest. Use of such a user interface may be especially useful when using a mobile device or other devices having a limited display area. Through use of embodiments described herein, individual developers in a distributed environment may easily identify potential conflicts between proposed elements and modifications with fewer steps.

FIG. 1 depicts an implementation of a system 100 for enabling a user to add or modify elements within a webpage or other user interface and determine conflicts between existing elements and a new or modified element. A webpage may be generated based on webpage data 102, which may include one or more types of program code, such as HTML, that may be represented, viewed, or accessed via a Document Object Model (DOM) tree or similar application programming interface (API). While FIG. 1 depicts webpage data 102 for generation of a webpage that includes webpage elements 104, in other implementations, other types of user interface data may be used to generate other types of user interfaces. For example, a user interface may include native content for an application executing on a mobile device, such as widgets, a browser application, and so forth. The webpage data 102 may be represented by a tree structure or similar hierarchical structure in which the arrangement of webpage elements 104 within a webpage may be determined based on the position of a webpage element 104 within the hierarchical structure. Webpage elements 104 may include one or more of alphanumeric data, audio data, video data, image data, or other types of data that may be presented using a webpage or other user interface. For example, a webpage element 104 may include an image block, a text block, one or more audio, video, haptic, or olfactory elements, and so forth. Continuing the example, FIG. 1 depicts the webpage data 102 including four example webpage elements 104.

A first webpage element 104(1) includes a text block, such as a title, heading, or other text or alphanumeric data positioned above one or more other webpage elements 104. The first webpage element 104(1) is shown associated with corresponding element characteristics 106(1) that may affect the manner in which the first webpage element 104(1) is presented. For example, FIG. 1 depicts first element characteristics 106(1) indicating a font and font size associated with the text block. The first webpage element 104(1) is also shown associated with first criteria 108(1). The first criteria 108(1) may indicate conditions that are satisfied by a request to access the webpage for the webpage element 104(1) to be presented. For example, the first criteria 108(1) may include a characteristic of the device requesting to access the webpage, such as an indication that the device is a mobile device. FIG. 1 depicts a second webpage element 104(2) that includes an image block, with associated element characteristics 106(2) associated with the size and location of the image block. The second webpage element 104(2) is also shown associated with criteria 108(2) indicative of a characteristic of the device accessing the webpage and a category of the webpage. A third webpage element 104(3) includes an image block, with associated element characteristics 106(3) indicating a size of the image block and associated criteria 108(3) indicating a characteristic of the requesting device, a location from which the request originates, and a category associated with the webpage. A fourth webpage element 104(4) includes an image block associated with element characteristics 106(4) indicating a size of the image block and criteria 108(4) indicating a characteristic of the requesting device and a category associated with the webpage.

When a request to access the webpage is received, characteristics associated with the request may be used to determine the particular webpage elements 104 that are included in the webpage and the element characteristics 106 of the webpage elements 104. For example, based on correspondence between characteristics of the request and the criteria 108 associated with the webpage elements 104, webpage elements 104 that correspond to the request may be determined. Criteria 108 may indicate a characteristic of a device requesting to access a webpage, such as the presence of absence of a display device, an audio output device, a size or shape of a display area, and so forth. Criteria 108 may also indicate a characteristic of a network connection, such as a latency, a signal strength, or a type of network. Criteria 108 may also indicate a characteristic of a user account requesting to access a webpage, or a characteristic of the webpage itself, such as a category of items offered for sale using a webpage. For example, a criteria 108 may indicate that if a webpage category is "clothing", a particular set of webpage elements 104, such as an image block having enlarged dimensions may be included in the webpage. As another example, a criteria 108 may indicate that if a quantity of latency associated with a network connection is less than a threshold quantity, a webpage element 104 that includes video data may be included. As yet another example, a criteria 108 may indicate that if a user account indicates that a user has impaired vision, or if the requesting device is executing a screen reading or text-to-speech application, webpage elements 104 that include audio output and simplified alphanumeric data may be included in place of webpage elements 104 that include image data or video data.

To modify or add webpage elements 104 to existing webpage data 102, a user accessing a user device 110 may provide user input 112 to one or more webpage servers 114 associated with the webpage data 102. While FIG. 1 depicts the user device 110 as a personal computer, the user device 110 may include any number and any type of computing device including, without limitation, one or more servers, personal computers, portable computing devices, automotive computing devices, gaming systems, smart televisions, networked speaker devices, media devices, set-top boxes, and so forth. Additionally, while FIG. 1 depicts the webpage server(s) 114 as a server, the webpage server(s) 114 may include any number and any type of computing devices including, without limitation, the types of computing devices described with regard to the user device 110.

The user input 112 may indicate a particular webpage element 104(5) to be added to the webpage data 102, such as an image block. The user input 112 may also include element characteristics 106(5) for the webpage element 104(5), such as the location of the image block within the webpage. The user input 112 may further include one or more criteria 108(5) that may be satisfied to cause output of the webpage element 104(5), such as a characteristic of the device requesting access to the webpage and a location from which the request originates.

The webpage server(s) 114 may determine correspondence between the user input 112 and the webpage data 102 to generate a conflict determination 116 indicative of existing conflicts between the webpage element 104(5) associated with the user input 112 and the webpage elements 104 of the webpage data 102. A conflict may exist if the criteria 108(5) associated with the user input 112 and the criteria 108 associated with an existing webpage element 104 overlap in a manner that could cause both webpage elements 104 to be presented in a webpage. For example, if a request could potentially include characteristics that would satisfy both sets of criteria 108 (e.g., the criteria 108(5) of the user input 112 are not mutually exclusive with the criteria 108 of an existing webpage element 104), a conflict between the webpage elements 104 may exist.

If the criteria 108(5) associated with the user input 112 and the criteria 108 associated with an existing webpage element 104 overlap in a manner that could cause both webpage elements 104 to be contemporaneously presented, the webpage server(s) 114 may determine whether the user input 112 and the existing webpage element 104 for which a potential conflict exists correspond to the same webpage element 104. For example, if a first set of criteria 108(1) is associated with an alphanumeric webpage element 104(1) that appears at the top of a webpage, while the criteria 108(5) associated with the user input 112 correspond to an image-based webpage element 104(5) located in a lower portion of the webpage, a conflict may not exist between the webpage elements 104 even though the criteria 108 for each webpage element 104 correspond.

If the criteria 108(5) of the user input 112 correspond to the criteria 108 for an existing webpage element 104, and both the user input 112 and the webpage data 102 are associated with the same webpage element 104, such as an image block located at the same position within a webpage, the webpage server(s) 114 may then determine whether the element characteristics 106(5) for the user input 112 are mutually exclusive with the element characteristics 106 of the webpage data 102. In some cases, the element characteristics 106 may not be mutually exclusive. For example, the user input 112 may indicate a location of an image block within the webpage, while the element characteristics 106 for an existing webpage element 104 may indicate the size of the image block. In such a case, a conflict may not exist between the user input 112 and the webpage data 102. In other cases, the element characteristics 106(5) of the user input 112 may be mutually exclusive with those of the webpage data 102. For example, both sets of element characteristics 106 may indicate different locations for an image block. In such a case, a conflict may exist between the webpage elements 104.

The conflict determination 116 may be provided to the user device 110 to inform a user regarding possible conflicts between the user input 112 and the webpage data 102. In response to the conflict determination 116, additional user input 112 may be provided to modify the webpage element 104(5), element characteristics 106(5), or criteria 108(5) in a manner that avoids the conflict. In other cases, the user associated with the user device 110 may modify the webpage data 102 or contact another user associated with a conflicting webpage element 104 to request modification of the webpage data 102. In some implementations, one or more of the user input 112 or the webpage data 102 may be modified automatically based on characteristics of the webpage elements 104, such as associated revenue amounts, user interactions, business goals, legal requirements, and so forth.

FIG. 1 depicts an example conflict determination 116 in which the third webpage element 104(3) does not conflict with the user input 112 due to mismatched criteria 108. For example, the third criteria 108(3) indicate a request location of "Country1", while the criteria 108(5) of the user input 112 indicate a request location of "Country2", such that a request to access the webpage could not satisfy both sets of criteria 108. The first webpage element 104(1) does not conflict with the user input 112 due to mismatched webpage elements 104. While the first webpage element 104(1) is associated with a set of criteria 108(1) that are not mutually exclusive with the criteria 108(5) of the user input 112, the first webpage element 104(1) is associated with a text block, while the user input 112 is associated with an image block. The fourth webpage element 104(4) does not conflict with the user input 104(1) due to mismatched element characteristics 106. While the fourth criteria 108(4) are not mutually exclusive with the criteria 108(5) of the user input, and the fourth webpage element 104(4) and the user input 112 both relate to an image block, the fourth element characteristics 106(4) relate to the size of the image block while the user input 112 relates to the location of the image block. As such, both sets of element characteristics 106 may be applied to the image block. The conflict determination 116 indicates a potential conflict between the second webpage element 104(2) and the user input 112. The second criteria 108(2) and the criteria 108(5) of the user input 112 are not mutually exclusive. The user input 112 and the second webpage element 104(2) both relate to an image block. Additionally, the second element characteristics 106(2) indicate a first location for the image block, while the user input 112 indicates a second, differing location for the image block.

Figure 2:
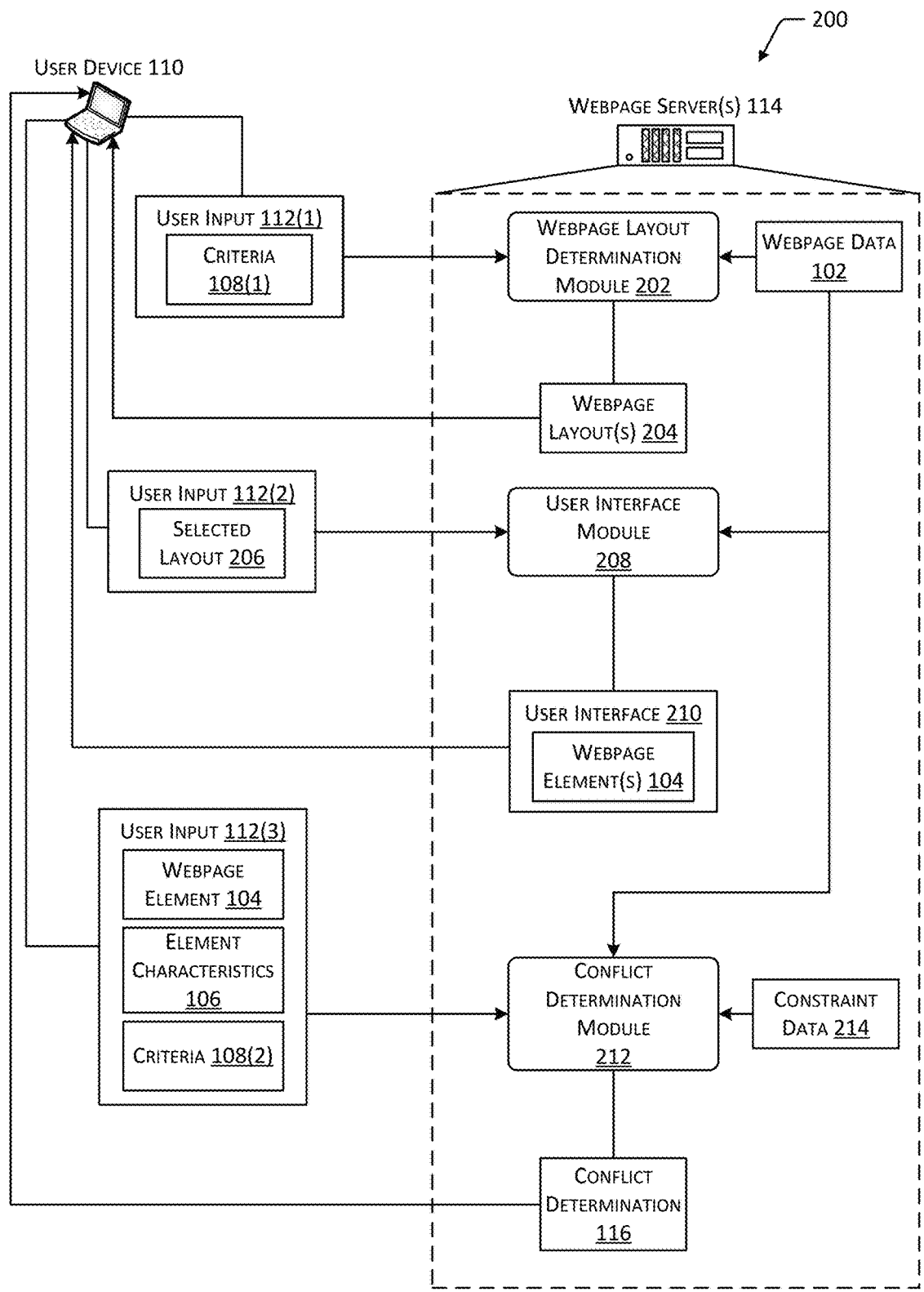
FIG. 2 depicts an implementation of a system for receiving user input associated with a new or modified user interface element and generating a conflict determination if the new or modified element conflicts with an existing element.

FIG. 2 depicts an implementation of a system 200 for receiving user input 112 associated with a new or modified user interface element and generating a conflict determination 116 if the new or modified element conflicts with an existing element. As described with regard to FIG. 1, while FIG. 2 depicts use of user input 112 to modify webpage elements 104 associated with a webpage, any type of user interface data associated with any type of user interface may be modified using the techniques described herein. An administrator, manager, developer, programmer, or other type of user accessing a user device 110 may provide first user input 112(1) to one or more webpage servers 114 to access a particular webpage or other user interface for modification. Specifically, the user input 112(1) may indicate one or more criteria 108(1), such as a type of webpage, a category associated with the webpage, a location associated with the webpage, a type of device or application for which the webpage is intended to be output, and so forth. A webpage layout determination module 202 associated with the webpage server(s) 114 may determine one or more webpage layouts 204 that correspond to the criteria 108(1) of the user input 112(1). Specifically, webpage data 102 may associate webpages with associated criteria 108(1) that may cause output of the webpage. The webpage layout determination module 202 may determine correspondence between the criteria 108 of the webpage data 102 and the criteria 108(1) of the user input 112(1) and generate a list or other output indicative of the webpage layouts 204 that correspond to the criteria 108(1) of the user input 112(1). An indication of the webpage layouts 204 may be provided to the user device 110.

The user device 110 may provide second user input 112(2) indicative of a selected layout 206 from the webpage layouts 204 to the webpage server(s) 114. A user interface module 208 associated with the webpage server(s) 114 may generate a user interface 210 in response to the user input 112(2). Specifically, the webpage data 102 may associate particular webpage layouts 204 with corresponding webpage elements 104. As described with regard to FIG. 1, webpage elements 104 may be stored in association with element characteristics 106 and criteria 108 that may cause the webpage element 104 to be presented if satisfied. Based on correspondence between the selected layout 206 and the webpage data 102, the user interface module 208 may determine the particular webpage elements 104 associated with the selected layout 206 and generate a user interface 210 presenting the webpage elements 104. In some implementations, the user interface 210 may also present one or more of the element characteristics 106 or the criteria 108 associated with the presented webpage elements 104.

As described with regard to FIG. 1, the user device 110 may provide user input 112(3) to modify the selected layout 206, such as by adding, deleting, or modifying one or more webpage elements 104. Specifically, the user input 112(3) may indicate a particular webpage element 104, one or more element characteristics 106, and one or more criteria 108(2) that may cause presentation of the webpage element 104 if satisfied by the characteristics of a request to access the webpage. A conflict determination module 212 associated with the webpage server(s) 114 may receive the user input 112(3) and determine correspondence between the user input 112(3) and constraint data 214. Correspondence between the user input 112(3) and the constraint data 214 may indicate whether the user input 112(3) includes an impermissible modification. For example, the constraint data 214 may include one or more prohibited webpage elements 104, element characteristics 106, or criteria 108. As another example, the constraint data 214 may indicate that particular webpage elements 104, element characteristics 106, or criteria 108 are prohibited from presentation if other particular elements, characteristics, or criteria 108 are present. As yet another example, the constraint data 214 may require certain elements, characteristics, or criteria 108 to be included, independently, or if other particular elements, characteristics, or criteria 108 are present. As such, constraint data 214 may include any manner of rule that may prevent one or more modifications to a webpage layout 204. For example, for a webpage associated with sale of items, the constraint data 214 may indicate that a price for the item must be present in at least one location, an item title must be located at the top of the webpage and must include at least a 20-point font, a button to purchase the item must be present, and if an image is presented, the image must have a size of at least 500 pixels by 500 pixels.

The conflict determination module 212 may also determine correspondence between the user input 112(3) and the webpage data 102. As described with regard to FIG. 1, correspondence between the criteria 108(2) of the user input 112(3) and criteria 108 associated with the webpage data 102 may indicate particular webpage elements 104 that could be presented contemporaneously with the webpage element 104 of the user input 112(3). If such an element is determined in the webpage data 102, correspondence between the element characteristics 106 of the user input 112(3) and those of the webpage data 102 may be determined. Corresponding element characteristics 106 may include element characteristics 106 that modify the same property of the same webpage element 104 or that place two webpage elements 104 within the same location of a webpage. For example, element characteristics 106 that indicated different sizes for the same webpage element 104 would be mutually exclusive. However, a first element characteristic 106 that indicated a color for the webpage element 104 and a second element characteristic 106 that indicated a size for the webpage element 104 would not be mutually exclusive. As another example, element characteristics 106 that indicated the same location within a webpage for a first webpage element 104 and a second webpage element 104 would be mutually exclusive.

The conflict determination module 212 may generate a conflict determination 116 indicative of any webpage elements 104 of the webpage data 102 that conflict with the user input 112(3). The conflict determination 116 may be provided to the user device 110. In some implementations, the conflict determination 116 may include user information or other information indicative of a goal, rationale, and so forth associated with the webpage element 104 of the webpage data 102. For example, based on the conflict determination 114, a user accessing the user device 110 may determine a modification to a webpage element 104 that would not generate a conflict, contact the user(s) associated with the conflicting element, determine performance metrics associated with the conflicting element, and so forth.

Figure 3:
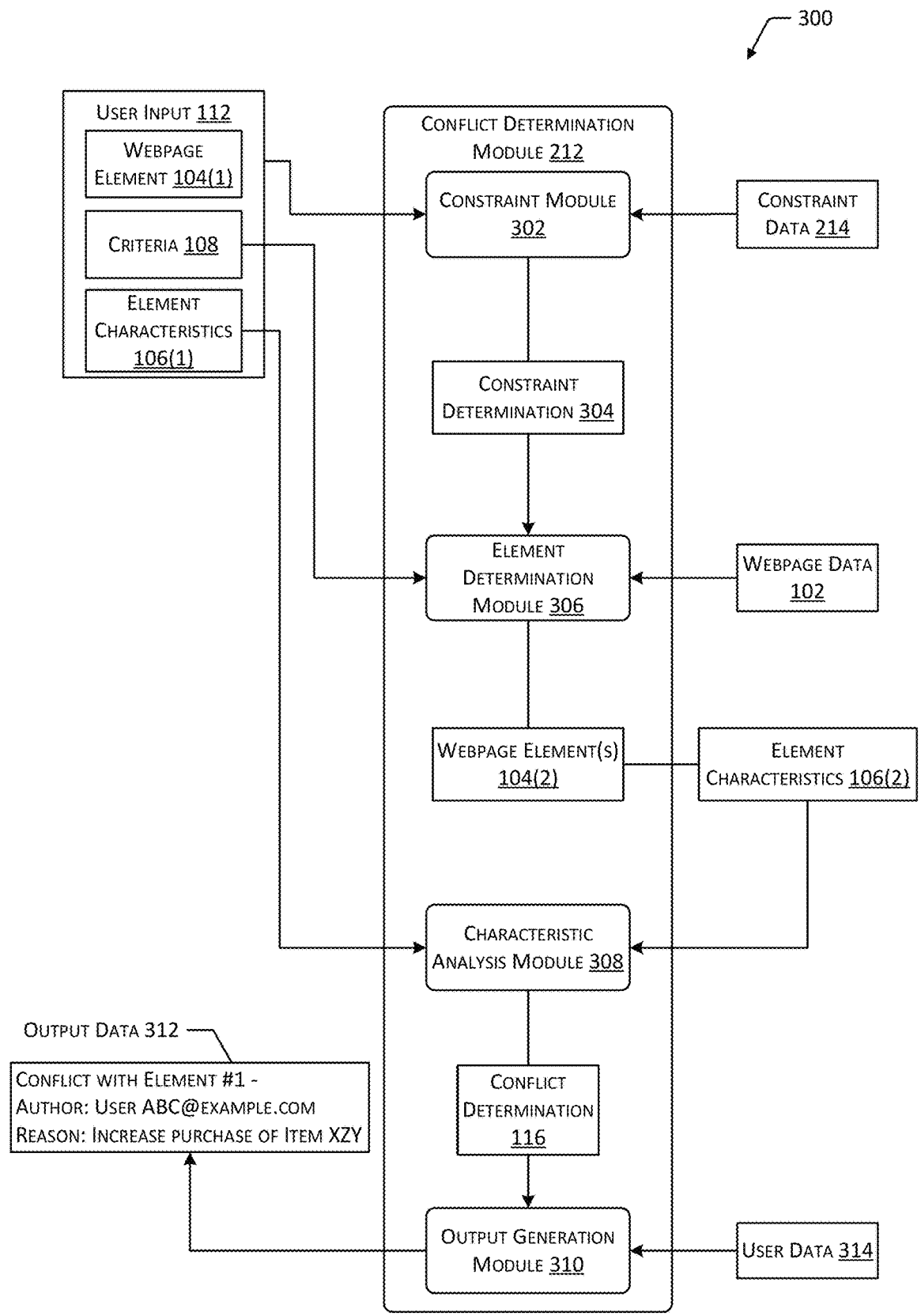
FIG. 3 depicts an implementation of a system for determining conflicts between user input, constraint data, and characteristics of existing user interface elements.

FIG. 3 depicts an implementation of a system 300 for determining conflicts between user input 112, constraint data 214, and characteristics of existing webpage elements 104. As described with regard to FIGS. 1 and 2, while user input 112 used to modify a webpage is depicted as one example of a user interface, other types of user interfaces may be modified using the techniques described herein. A conflict determination module 212 associated with one or more webpage servers 114 may receive user input 112 indicating a new or modified webpage element 104(1). The user input 112 may also indicate criteria 108 and element characteristics 106(1) associated with the webpage element 104(1). A constraint module 302 associated with the content determination module 212 may determine correspondence between the user input 112 and constraint data 214. As described with regard to FIG. 2, constraint data 214 may indicate particular requirements or limitations associated with generation of a user interface. For example, constraint data 214 may indicate certain elements, such as an item name or item price, that must be present in a webpage. As another example, constraint data 214 may indicate that certain elements must be positioned before or after certain other elements, or within certain regions of a webpage. As yet another example, constraint data 214 may indicate a minimum or maximum count of elements to be included in a webpage, certain elements that may not be included if other elements are present, certain elements that are required to be included if other elements are present, and so forth. Constraint data 214 may also indicate limitations regarding dimensions, shapes, colors, or other element characteristics 106 of certain elements, and in some cases, dimensions of a webpage element 104 relative to other elements.

The constraint module 302 may generate a constraint determination 304 indicative of whether the user input 112 violates a constraint indicated in the constraint data 214. If the user input 112 violates a constraint, an indication of the constraint determination 304 may be provided to the user device 110 providing the user input 112. If the user input 112 does not violate a constraint, an element determination module 306 associated with the conflict determination module 212 may determine correspondence between the criteria 108 associated with the user input 112 and webpage data 102. As described with regard to FIGS. 1 and 2, webpage data 102 may associate existing webpage elements 104 with corresponding criteria 108. Correspondence between the criteria 108 of the user input 112 and the criteria 108 of the webpage data 102 may indicate particular webpage elements 104(2) for which a single request may satisfy the criteria 108 of the particular webpage elements 104(2) and the criteria 108 of the user input 112. If a request satisfying both sets of criteria 108 were received, a webpage may be generated that contemporaneously presents both the webpage element 104(1) of the user input 112 and the particular webpage elements 104(2) determined by the element determination module 306. In such a case, a conflict may exist between the contemporaneously presented webpage elements 104.

As described with regard to FIG. 1, each webpage element 104(2) of the webpage data 102 may be stored in association with corresponding element characteristics 106(2). If a request is received that satisfies each element characteristic 106(2) for a webpage element 104(2), the webpage element 104(2) may be included in a webpage generated in response to the request. A characteristic analysis module 308 associated with the conflict determination module 212 may determine correspondence between the element characteristics 106(1) associated with the user input 112 and the element characteristics 106(2) for the webpage elements 104(2) determined by the element determination module 306. Correspondence between the sets of element characteristics 106 may include mutually exclusive characteristics. For example, mutually exclusive characteristics may include element characteristics 106 that modify the same property of the same webpage element 104. Continuing the example, element characteristics 106(1) of the user input 112 that indicate a first size for an image block and element characteristics 106(2) for an existing webpage element 104(2) that indicate a different size for the same image block would be mutually exclusive. As another example, a mutually exclusive characteristic may include element characteristics 106 that place a webpage element 104 within the same location of a webpage as another webpage element 104. The characteristic analysis module 308 may generate a conflict determination 116 indicating the presence or absence of mutually exclusive sets of element characteristics 106. As described with regard to FIG. 1, in some implementations, the conflict determination 116 may indicate one or more of webpage elements 104 for which no conflict with the user input 112 exists, webpage elements 104 having matching criteria 108 that do not relate to the same webpage element 104 as the user input 112, webpage elements 104 having matching criteria 108 but do not have element characteristics 106 that are mutually exclusive with the user input 112, and webpage elements 104 that conflict with the user input 112 due to matching criteria 108, elements, or characteristics.

In some implementations, an output generation module 310 associated with the conflict determination module 212 may generate output data 312 based on the conflict determination 116. The output generation module 310 may access user data 314, which associates webpage elements 104 with user input information, such as the creator of a webpage element 104 or a user input reason for use of the webpage element 104. In addition to including data indicative of the conflict determination 116, the output data 312 may include an indication of a user or group of users associated with a conflicting webpage element 104, and in some cases, data indicative of a rationale for use of the webpage element 104. Inclusion of data indicating an author or rationale for a webpage element 104 may facilitate generation of a modification to a webpage that does not conflict with an existing webpage element 104. In some cases, inclusion of such data may enable a user seeking to modify a webpage to contact other users to resolve a conflict, such as by requesting a change to an existing webpage element 104 or permission to test the effectiveness of a new or modified webpage element 104.

Figure 4:
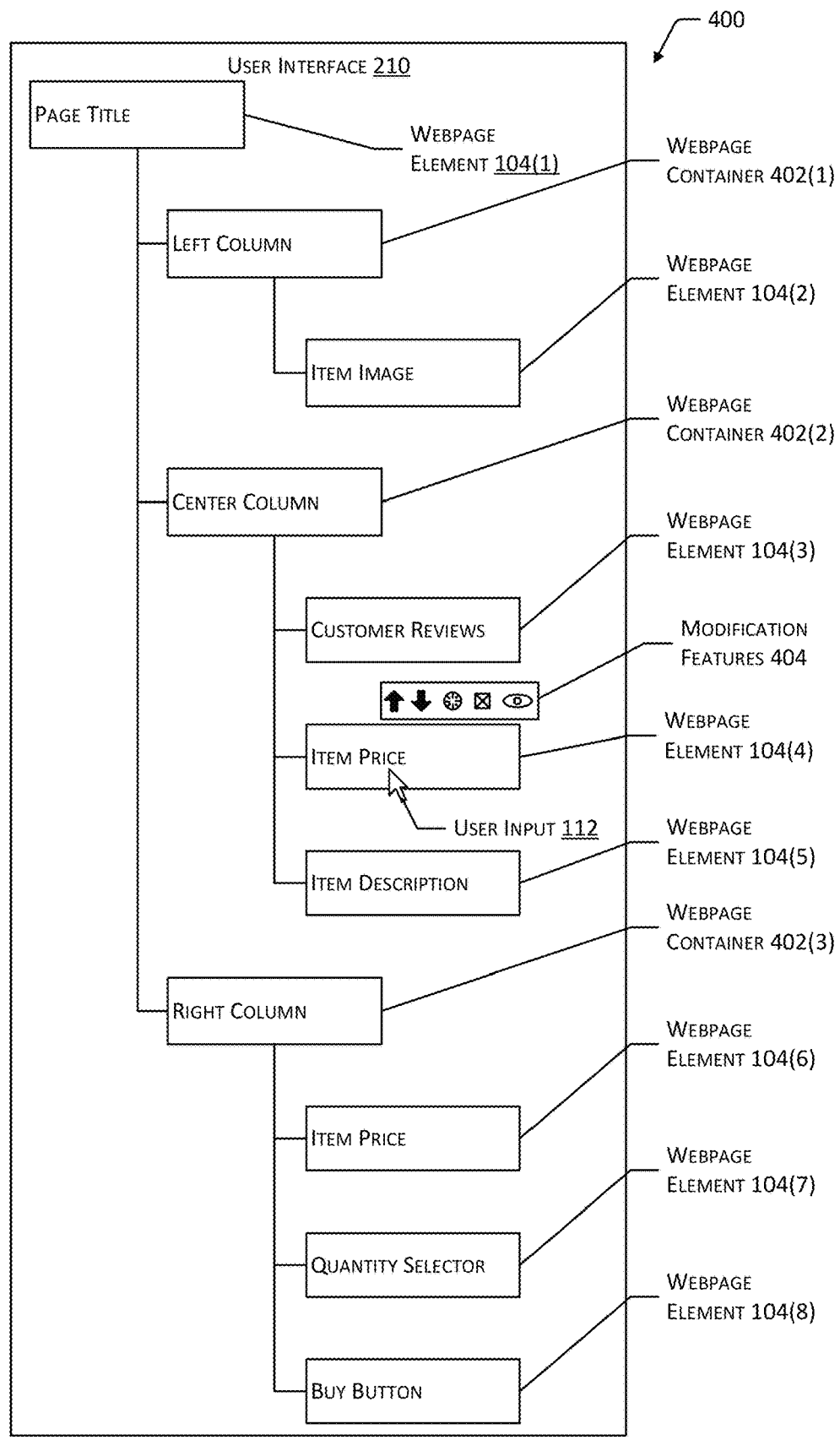
FIG. 4 is a block diagram illustrating an example user interface for adding or modifying user interface elements associated with a webpage or other user interface.

FIG. 4 is a block diagram 400 illustrating an example user interface 210 for adding or modifying webpage elements 104 associated with a webpage. As described previously, a webpage or other type of user interface or document may be conceptually represented as a hierarchical structure, such as a tree structure. For example, program code associated with a webpage may be accessed via a DOM tree or similar API. As such, the example user interface 210 may present multiple webpage elements 104 in a hierarchical arrangement. For example, a first webpage element 104(1) located at the top of the user interface 210 may represent a primary node of the hierarchical arrangement, such as a text block that includes a title for a webpage. Secondary nodes that depend from the primary node may represent webpage containers 402. For example, a webpage that includes three zones, such as columns, may include a first webpage container 402(1) in the user interface 210 that represents a left column, a second webpage container 402(2) that represents a center column, and a third webpage container 402(3) that represents a right column. Each node that depends from one of the webpage containers 402 may represent webpage elements 104 within that webpage container 402.

For example, FIG. 4 depicts a second webpage element 104(2) that depends from the first webpage container 402(1). The second webpage element 104(2) may represent an item image. For example, the second webpage element 104(2) may include an image block having dimensions, a shape, a color scheme, and a location within the left column defined by the element characteristics 106 for the second webpage element 104(2).

FIG. 4 depicts a third webpage element 104(3), a fourth webpage element 104(4), and a fifth webpage element 104(5) depending from the second webpage container 402(2). The third webpage element 104(3) may include a dynamic element, such as alphanumeric data or image data indicating customer ratings or reviews for an item. The data represented by the third webpage element 104(3) may change as a count of customer reviews or an average customer rating for an item changes. In some implementations, the third webpage element 104(3) may also include a link to one or more other webpages, such as a webpage associated with customer reviews of an item. A fourth webpage element 104(4) and a fifth webpage element 104(5) may include static elements, such as an item price and an item description, respectively. For example, the fourth webpage element 104(4) and fifth webpage element 104(5) may include alphanumeric data input by a user describing an item available for purchase and indicating the cost of the item. In other implementations, an item price may include a dynamic element that is determined based on other existing values or data at the time the webpage is generated.

FIG. 4 depicts a sixth webpage element 104(6), a seventh webpage element 104(7), and an eighth webpage element 104(8) depending from the third webpage container 402(3). The sixth webpage element 104(6) may include an indication of an item price. For example, the price of an item may be presented at multiple locations in a webpage, such as proximate to an image or description of an item and proximate to a button or other element for purchasing the item or adding the item to an electronic shopping cart. The seventh webpage element 104(7) may include an interactive element, such as a quantity selector that receives user input 112 selecting a quantity of items for purchase. The eighth webpage element 104(8) may include a button or other type of selectable or interactive element for purchasing an item.

Each webpage element 104 or webpage container 402 presented in the user interface 210 may be modified by providing user input 112 to the user interface 210. For example, selection or positioning of a cursor proximate to a webpage element 104 may cause presentation of one or more modification features 404 that may be used to modify or determine information regarding the webpage element 104. Continuing the example, FIG. 4 depicts modification features 404 that include five selectable buttons. A first button may be used to add a new webpage element 104 or webpage container 402 above the selected webpage element 104. A second button may be used to add a new webpage element 104 or webpage container 402 below the selected webpage element 104. A third button may be used to view or modify criteria 108 associated with the selected webpage element 104. A fourth button may be used to remove the selected webpage element 104 from the webpage. A fifth button may be used to view or modify element characteristics 106 associated with the selected webpage element 104. Other modification features 404 may include features for viewing or accessing data associated with a statistical hypothesis test associated with a webpage element 104, such as an A/B test. For example, a webpage element 104 may be configured to only be presented on selected instances when a webpage is accessed, such as when a user is assigned a particular state as part of an A/B text. In some implementations, selection of a webpage element 104 or modification feature 404 may function as a link to a separate user interface 210 for receiving user input 112 associated with new webpage elements 104, modification to an existing webpage element 104, data regarding a statistical hypothesis test, and so forth.

Figure 5:
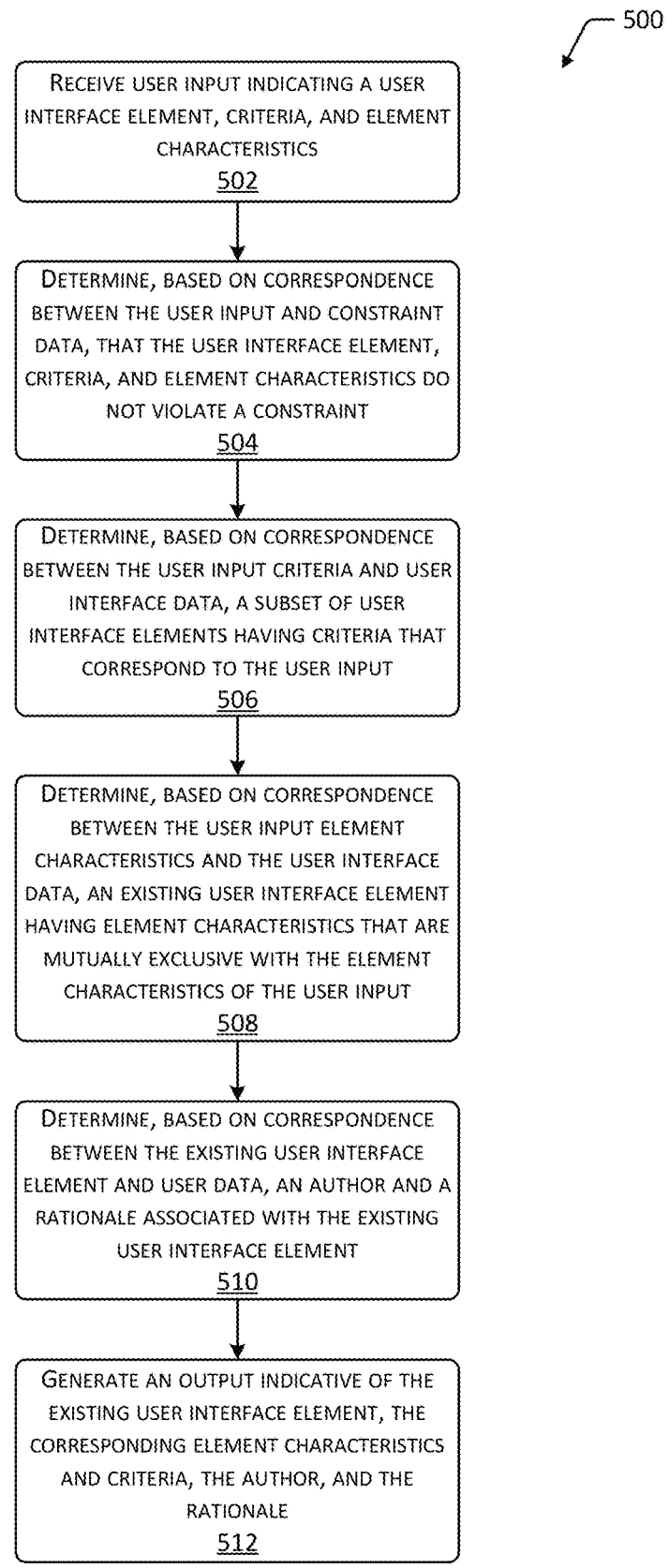
FIG. 5 is a flow diagram illustrating a method for determining conflicts between a user input modification to a user interface and existing user interface elements and generating an output indicative of the conflict.

FIG. 5 is a flow diagram 500 illustrating a method for determining conflicts between a user input modification to a user interface and existing user interface elements and generating an output indicative of the conflict. At 502, user input 112 indicating a user interface element, such as a webpage element 104 associated with a webpage, criteria 108 for causing presentation of the element, and element characteristics 106 for controlling the manner in which the element is presented may be received. For example, a webpage element 104 may include a text block, an image block, or another type of container for presenting one or more of alphanumeric data, image data, video data, audio data, and so forth within a webpage. The element characteristics 106 may include one or more audible or visible characteristics of the element, such as a font, font size, dimensions, shape, color, volume, and so forth. The criteria 108 may indicate particular characteristics of a request, requesting device, network connection, and so forth that may be satisfied for the element to be included in a user interface generated in response to the request. For example, criteria 108 may indicate a device type, such as a mobile device, a particular browser application executing on the requesting device, a latency value associated with communication with the requesting device, a location associated with the request, a category associated with the requested webpage, and so forth. Continuing the example, the user input 112 may propose enlarging the size of a button used to purchase an item for mobile devices located in a particular country requesting to access a user interface associated with clothing items.

At 504, a determination may be made, based on correspondence between the user input 112 and constraint data 214, that the user interface element, criteria 108, and element characteristics 106 of the user input 112 do not violate a constraint. As described with regard to FIG. 2, constraint data 214 may include any manner of rule that may prevent one or more modifications to a webpage layout 204 or other type of layout associated with a user interface. For example, constraint data 214 may indicate required or prohibited webpage elements 104, element characteristics 106, and criteria 108 associated with a webpage.

At 506, based on correspondence between the criteria 108 of the user input 112 and user interface data that associates existing user interface elements with criteria 108, a subset of user interface elements having criteria 108 that correspond to the user input 102 may be determined. For example, existing webpage elements 104 that are configured to be presented in response to one or more of requests from mobile devices, requests from devices located in a particular country, or requests to access webpages associated with clothing items, without including other criteria 108 that are mutually exclusive with these may be presented contemporaneously with a webpage element 104 indicated in the user input 112.

At 508, based on correspondence between the element characteristics 106 of the user input 112 and the user interface data, an existing user interface element having element characteristics 106 that are mutually exclusive with the element characteristics 106 of the user input 112 may be determined. Element characteristics 106 may be mutually exclusive if two sets of element characteristics 106 relate to the same feature of the same element. For example, if the user input 112 indicates a particular size for a button to purchase a product and the element characteristics 106 for an existing element indicate a different size for the button, these element characteristics 106 are mutually exclusive. However, element characteristics 106 that relate to other aspects of the element, such as its color or location, may not be mutually exclusive with user input 112 indicative of a size of the element. In some cases, element characteristics 106 associated with different user interface elements may conflict with the user interface element of the user input 112 due to the location of the user interface elements. For example, if the element characteristics 106 of the user input 112 indicate a location that at least partially overlaps a location indicated by the element characteristics 106 of an existing user interface element, the characteristics may be mutually exclusive.

At 510, based on correspondence between the existing user interface element and user data 314, an author and a rationale associated with the existing user interface element may be determined. For example, as described with regard to FIG. 3, data indicating an author or rationale for a webpage element 104 may facilitate generation of a modification that does not conflict with the existing webpage element 104. Data indicative of an author or rationale may also enable a user to contact other users to resolve a conflict. At 512, an output indicative of the existing user interface element, the corresponding element characteristics 106 and the criteria 108, the author, and the rationale may be generated.

Figure 6:
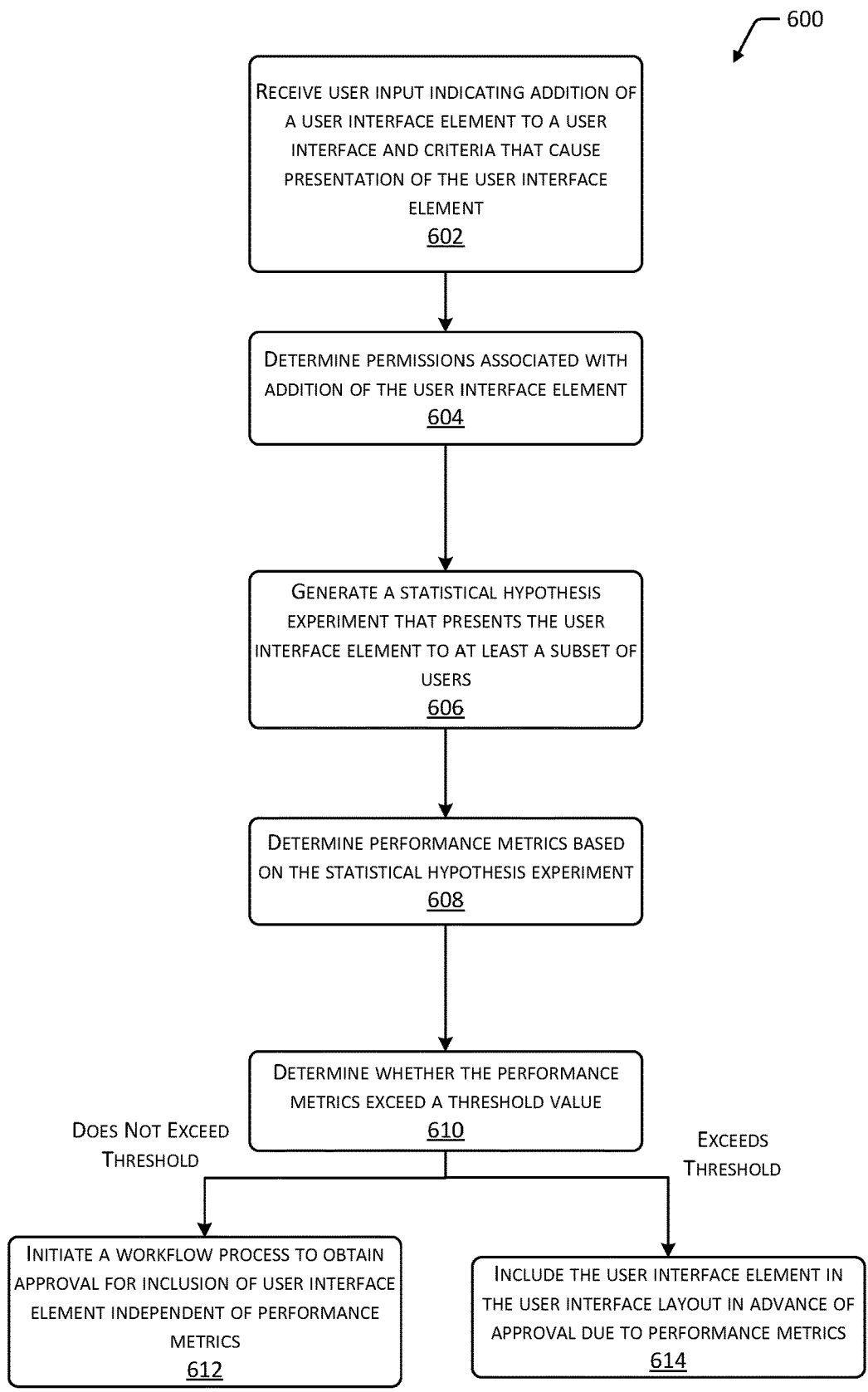
FIG. 6 is a flow diagram illustrating a method for adding a new user interface element to a user interface layout based on performance metrics associated with a statistical hypothesis experiment.

FIG. 6 is a flow diagram 600 illustrating a method for adding a new user interface element to a user interface layout based on performance metrics associated with a statistical hypothesis experiment. At 602, user input 112 indicating addition of a user interface element to a user interface layout may be received. The user input 112 may also indicate criteria 108 that cause presentation of the element. For example, the user input 112 may take the form of a rule in which if the criteria 108 are satisfied by a received request, an associated webpage element 104 is included in the webpage generated in response to the request.

At 604, permissions associated with addition of the user interface element may be determined. For example, a determination may be made regarding whether the user providing the user input 112 is authorized to add the new user interface element. If the user lacks such authorization, a notification indicating a lack of authorization may be provided to the user. If the user is permitted to add the new element, a determination may be made regarding whether notifications to other users must be provided or whether approval from other users must be obtained prior to adding the new element. If the required approvals are not received, a notification indicating a lack of approval may be provided to the user.

If the required notifications are sent and the required approvals are received, at 606, a statistical hypothesis experiment that presents the user interface element to at least a subset of users may be generated. For example, the statistical hypothesis experiment may include an A/B test in which a new webpage element 104 is presented to a first portion of users requesting access to a webpage layout 204, while the new webpage element 104 is not included in webpage layouts 204 presented to a second portion of users. User interactions for the first portion and second portion of users may be compared to determine the effect of the new webpage element 104 on user interactions.

At 608, performance metrics based on the statistical hypothesis experiment may be determined. Performance metrics may include a count of views of the user interface element, a count of clicks, impressions, or other types of user interactions, a count of purchases, a revenue amount, and so forth.

At 610, a determination may be made whether the performance metrics for the statistical hypothesis experiment exceed a threshold value. In some implementations, if the performance metrics do not exceed the threshold value, a notification indicative of the performance metrics may be provided to the user, and the proposed new user interface element may be archived. In other implementations, as illustrated at 612, a workflow process may be initiated to provide the user interface element to one or more administrators or other users that may approve the user interface element for inclusion in a user interface layout independent of the performance metrics for the element. However, if the performance metrics exceed the threshold value, at 614, the user interface element may be included in the user interface layout 204 in advance of such approval due to the performance metrics exceeding the threshold value. For example, in some implementations, the user interface element may replace a conflicting webpage element automatically, based on the performance metrics for the new user interface element exceeding the threshold value or exceeding performance metrics associated with the existing user interface element.

Figure 7:
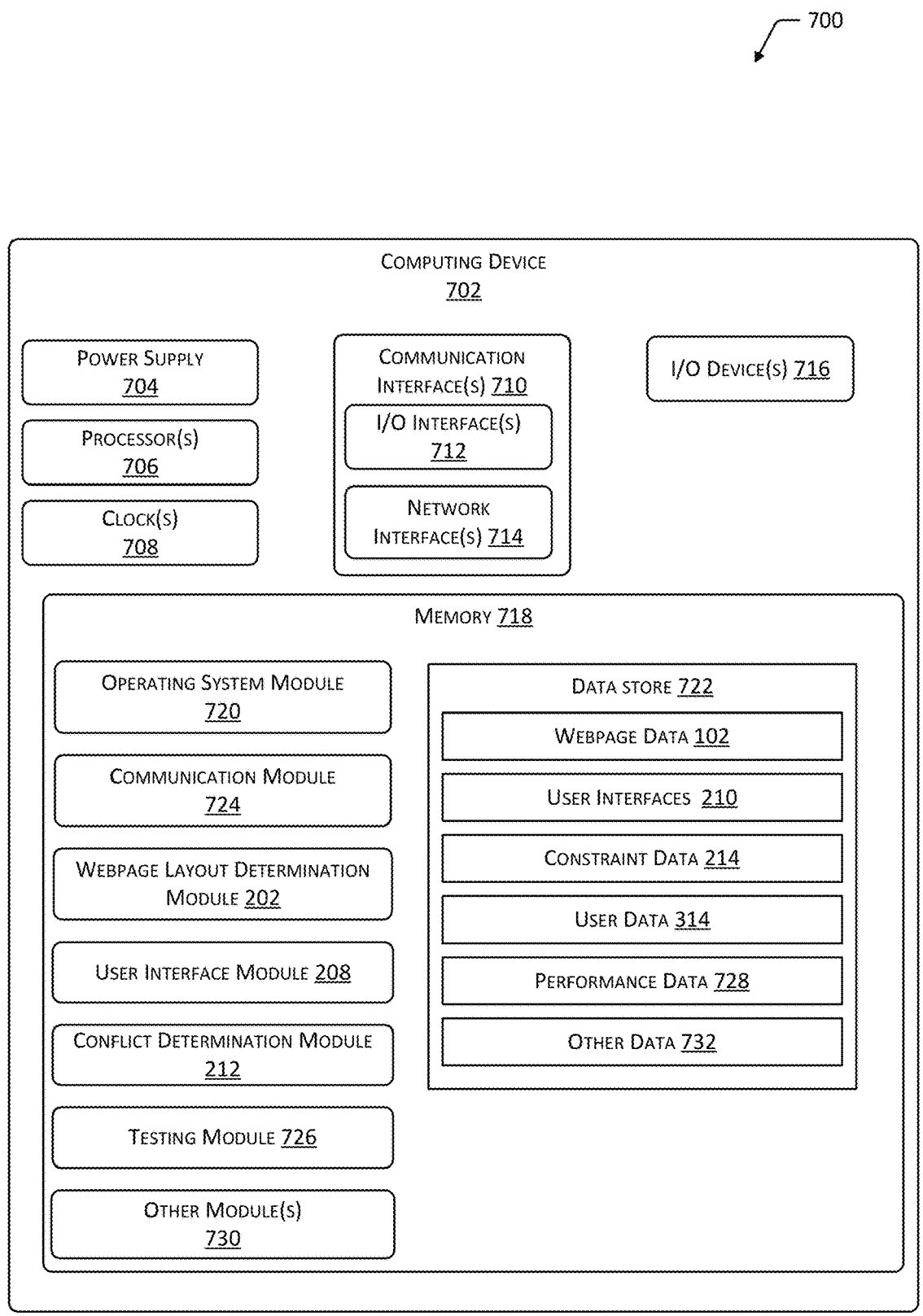
FIG. 7 is a block diagram of a computing device within the present disclosure.

FIG. 7 is a block diagram 700 of a computing device 702 within the present disclosure. In some implementations, the computing device 702 may include one or more webpage servers 114. In other implementations, the computing device 702 may include one or more user devices 110. While FIG. 7 depicts a single block diagram 700 representative of a computing device 702, any number of networked computing devices 702 may perform the implementations described herein.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clock(s) 708 may provide information indicative of date, time, ticks, and so forth. For example, the processor(s) 706 may use data from the clock 708 to generate a timestamp, trigger a preprogrammed action, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components of the other computing devices 702. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input device or output device associated with the computing device 702. For example, I/O devices 716 may include touch sensors, keyboards, mouse devices, microphones, image sensors (e.g., cameras), scanners, displays, speakers, haptic devices, printers, and so forth. In some implementations, the I/O devices 716 may be physically incorporated with the computing device 702 or may be externally placed.

The network interfaces 714 may be configured to provide communications between the computing device 702 and other devices, such as the I/O devices 716, routers, access points, and so forth. The network interfaces 714 may include devices configured to couple to one or more networks including local area networks (LANs), wireless LANs (WLANs), wide area networks (WANs), wireless WANs, and so forth. For example, the network interfaces 714 may include devices compatible with Ethernet, Wi-Fi, Bluetooth, ZigBee, Z-Wave, 3G, 4G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 722 and one or more of the following modules may also be associated with the memory 718. The modules may be executed as foreground applications, background tasks, daemons, and so forth. The data store(s) 722 may use a flat file, database, linked list, tree, executable code, script, or other data structure to store information. In some implementations, the data store(s) 722 or a portion of the data store(s) 722 may be distributed across one or more other devices including other computing devices 702, network attached storage devices, and so forth.

A communication module 724 may be configured to establish communications with one or more other computing devices 702. Communications may be authenticated, encrypted, and so forth.

The memory 718 may also store the webpage layout determination module 202. The webpage layout determination module 202 may determine correspondence between user input 112 indicating a set of criteria 108 and webpage data 102 that associates criteria 108 with webpage layouts 204. In other implementations, other types of user interfaces that correspond to user input 112 may be determined. Based on this correspondence, the webpage layout determination module 202 may determine a set of webpage layouts 204 that include criteria 108 within a threshold tolerance of the criteria 108 of the user input 112. A list or other type of output or interface presenting the determined webpage layouts 204 may be provided in response to the user input 112.

The memory 718 may also store the user interface module 208. The user interface module 208 may determine, based on user input 112 indicating a selected layout 206 and the webpage data 102, a set of webpage elements 104 included in the selected layout 206. For example, a user interface 210 may include a hierarchical structure, as shown in FIG. 4, that enables selection and interaction with webpage elements 104 and webpage containers 402. In other implementations, a user interface 210 presenting elements for inclusion in other types of user interfaces may be generated.

The memory 718 may additionally store the conflict determination module 212. As described with regard to FIG. 3, the conflict determination module may determine correspondence between user input 112 and constraint data 214 to determine whether a proposed modification to a user interface layout violates a constraint indicated in the constraint data 214. The conflict determination module 212 may also determine correspondence between the criteria 108 associated with a user input element and the criteria 108 associated with one or more existing user interface elements, such as webpage elements 104 of the webpage data 102. Based on this correspondence, particular webpage elements 104 that may potentially be presented contemporaneously with the webpage element 104 associated with the user input 112 may be determined. The conflict determination module 212 may additionally determine correspondence between the element characteristics 106 of the user input 112 and element characteristics 106 of webpage elements 104 of the webpage data 102. This correspondence may indicate webpage elements 104 having element characteristics 106 that are mutually exclusive with the user input webpage element 104, which would prevent contemporaneous presentation of both webpage elements 104. The conflict determination module 212 may also generate output data 312 indicative of a conflicting webpage element 104, the corresponding element characteristics 106 and criteria 108, and in some cases, an author, and a rationale associated with the conflicting webpage element 104, which may be determined based on user data 314.

A testing module 726 in the memory 718 may assign states for a statistical hypothesis test to accounts or devices and cause user interfaces that include new or modified user interface elements to be provided to a first portion of devices, while providing existing or unmodified elements to other devices. The testing module 726 may generate performance data 728 indicative of performance metrics associated with various user interface elements. Performance metrics may include user interactions, such as views, clicks, dwell time, purchases, and so forth.

Other modules 730 may also be present in the memory 718. For example, encryption modules may be used to encrypt and decrypt communications between computing devices 702. Authentication modules may be used to authenticate communications sent or received by computing devices 702. Other modules 730 may also include modules for detecting characteristics of a computing device 702, such as characteristics of a display, audio output device, browser or other application, and so forth.

Other data 732 within the data store(s) 722 may include configurations, settings, preferences, and default values associated with computing devices 702. Other data 732 may include encryption keys and schema, access credentials, and so forth. Other data 732 may additionally include rules and schema for execution of statistical hypothesis tests, replacement of webpage elements 104 based on performance metrics, and so forth.

In different implementations, different computing devices 702 may have different capabilities or capacities. For example, webpage servers 114 may have greater processing capabilities or data storage capacity than user devices 110.

Figure 8:
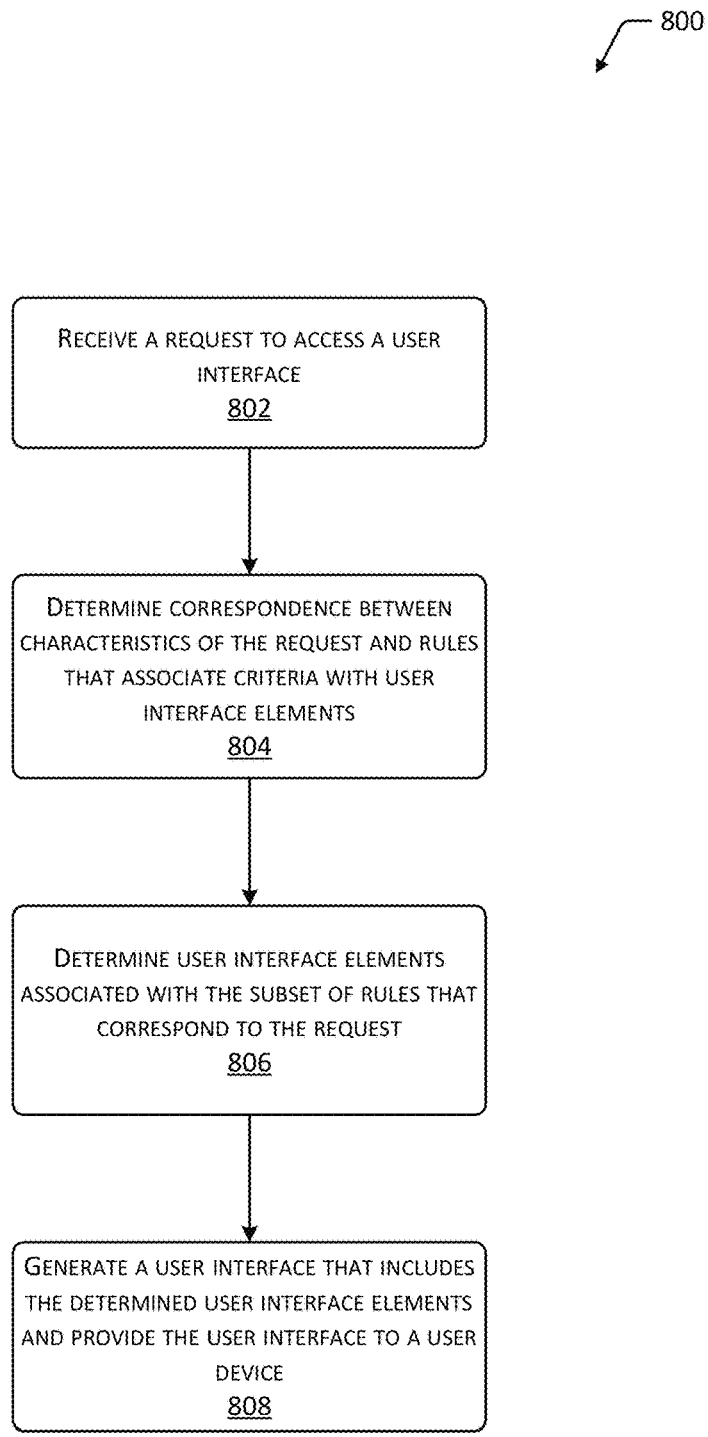
FIG. 8 is a flow diagram illustrating a method for generating a user interface in response to a request based on correspondence between characteristics of the request and rules that associate criteria with user interface elements.

FIG. 8 is a flow diagram 800 illustrating a method for generating a user interface in response to a request based on correspondence between characteristics of a request and rules that associate criteria 108 with user interface elements. At 802, a request to access a user interface may be received. For example, a user device 110 or other type of computing device 702 may provide a request to a webpage server 114 or other type of computing device 702 configured to access stored user interfaces. The request may be associated with various request characteristics such as a source of the request, device characteristics of the requesting device, characteristics of the content associated with the requested user interface, and so forth.

At 804, correspondence between the characteristics of the request and rules that associate criteria 108 with user interface elements may be determined. For example, as described with regard to FIGS. 1-3, webpage elements 104 of a webpage may be associated with criteria 108 and element characteristics 106. As such, each webpage element 104 may be stored as a rule, such that if the criteria 108 associated with a webpage element 104 match the characteristics of a request, a webpage that includes the webpage element 104 having the associated element characteristics 106 may be generated. A resulting webpage or other type of user interface may therefore include a set of elements associated with rules that correspond to the characteristics of a received request. When a request having various request characteristics is received, a subset of rules that correspond to the request may therefore be identified.

At 806, user interface elements associated with the subset of rules that correspond to the request may be determined. As described with regard to FIGS. 1-3, each user interface element may be stored in association with corresponding criteria 108. User interface elements stored in association with the criteria 108 that correspond to the request may be included in a user interface provided in response to the request. As such, at 808, a user interface that includes the determined user interface elements may be generated and provided to a user device.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive, from a first user device, first user input indicating a first set of criteria for causing presentation of a webpage including a set of webpage elements;
determine first correspondence between the first set of criteria and webpage data that associates criteria with webpage elements;
generate, based on the first correspondence, a user interface that presents a plurality of webpage elements within a webpage, wherein the plurality of webpage elements are associated with criteria that correspond to the first set of criteria;
provide the user interface to one or more of the first user device or a second user device;
receive, from the one or more of the first user device or the second user device, second user input to add a new webpage element to the webpage or modify a first webpage element of the plurality of webpage elements, wherein the second user input includes:
a second set of criteria for causing presentation of the new webpage element or the first webpage element; and
a first set of element characteristics for controlling presentation of the new webpage element or the first webpage element;
determine second correspondence between the second set of criteria and the webpage data, wherein the second correspondence indicates a second webpage element associated with one or more criteria that are common to the first set of criteria, the second webpage element is associated with a second set of element characteristics for controlling presentation of the second webpage element, and the second webpage element is associated with third user input received from a third user device before receiving the first user input;
in response to the second correspondence, determine third correspondence between the second set of element characteristics and the first set of element characteristics, wherein the third correspondence indicates one or more element characteristics that are common to the second webpage element and the new webpage element or the first webpage element;
generate a conflict determination indicative of one or more of:
the one or more criteria that are common to the first set of criteria; or
the one or more element characteristics that are common to the second webpage element and the new webpage element or the first webpage element; and
provide data indicative of the conflict determination to the one or more of the first user device or the second user device.

2. The system of claim 1, further to execute the computer-executable instructions to:
before receiving the first user input, receive fourth user input indicative of a source of the second webpage element and text indicative of one or more of a goal or a reason associated with the second webpage element;

in response to the conflict determination, determine the source and the text indicative of the one or more of the goal or the reason; and provide data indicative of the source and the one or more of the goal or the reason to the one or more of the first user device or the second user device.

3. The system of claim 1, further to execute the computer-executable instructions to:

prior to receiving the first user input, receive fourth user input indicating a third set of criteria for causing presentation of the webpage;

determine a plurality of webpage layouts that correspond to the third set of criteria;

provide a list of the plurality of webpage layouts to the first user device;

receive fifth user input selecting a first webpage layout of the plurality of webpage layouts; and determine that the plurality of webpage elements are associated with the first webpage layout, wherein the plurality of webpage elements are provided to the first user device in response to the fifth user input.

4. The system of claim 1, further to execute the computer-executable instructions to:

determine a first performance metric associated with the new webpage element or the first webpage element;

determine a second performance metric associated with the second webpage element;

determine that the first performance metric exceeds the second performance metric; and in response to the first performance metric exceeding the second performance metric, automatically replace the second webpage element in the webpage with the first webpage element.

5. A method comprising:

receiving first user input, wherein the first user input includes:

first criteria for causing presentation of a first user interface element; and first element characteristics for controlling one or more first characteristics of the presentation of the first user interface element;

determining first correspondence between the first criteria and user interface data, wherein the user interface data associates each of a plurality of user interface elements with a respective one or more criteria, and the plurality of user interface elements include a second user interface element associated with second criteria;

based on the first correspondence, determining that the second criteria associated with the second user interface element at least partially correspond to the first criteria associated with the first user interface element included in the first user input, wherein the second user interface element is associated with second element characteristics for controlling one or more second characteristics of presentation of the second user interface element;

determining second correspondence between the first criteria associated with the first user input and the second criteria associated with the second user interface element;

determining third correspondence between the first element characteristics and the second element characteristics; and generating output indicative of one or more of the second correspondence or the third correspondence, wherein the output indicates a conflict determination for contemporaneous presentation of the first user interface element and the second user interface element, and wherein the conflict determination indicates one or more of at least a portion of the second criteria correspond to at least a portion of the first criteria, or at least a portion of the first element characteristics correspond to at least a portion of the second element characteristics.

6. The method of claim 5, further comprising:

before receiving the first user input, receiving second user input indicative of one or more of a source of the second user interface element or text indicative of one or more of a goal or a reason associated with the second user interface element; and including, in the output, an indication of the one or more of the source or the text indicative of the one or more of the goal or the reason.

7. The method of claim 5, further comprising:

determining that a first performance metric associated with the first user interface element exceeds a second performance metric associated with the second user interface element; and in response to the first performance metric exceeding the second performance metric, causing presentation of the first user interface element and suppressing presentation of the second user interface element.

8. The method of claim 5, further comprising:

determining a modification to the first criteria that causes a difference between the first criteria and the second criteria, wherein the modification prevents contemporaneous presentation of the first user interface element and the second user interface element; and including an indication of the modification in the output.

9. The method of claim 5, further comprising:

determining a modification to the first element characteristics that causes a difference between the first element characteristics and the second element characteristics, wherein the modification enables contemporaneous presentation of the first user interface element and the second user interface element; and including an indication of the modification in the output.

10. The method of claim 5, further comprising:

providing a user interface to a user device, wherein the first user input is received via the user interface and the user interface presents the plurality of user interface elements associated with the user interface data as a tree structure; and wherein receiving the first user input includes receiving one or more of:

selection of one of the plurality of user interface elements within the tree structure to modify the one of the plurality of user interface elements; or selection of a button associated with the one of the plurality of user interface elements to add a new user interface element adjacent to the one of the plurality of user interface elements.

11. The method of claim 5, further comprising:

receiving second user input associating the first user interface element with a campaign associated with a plurality of user interface elements;

determining that a first performance metric associated with the campaign exceeds a threshold performance metric; and in response to the first performance metric exceeding the threshold performance metric, causing presentation of the first user interface element and suppressing presentation of the second user interface element.

12. The method of claim 5, further comprising:

receiving second user input indicating third criteria for causing presentation of a user interface;

determining a plurality of user interfaces that correspond to the third criteria;

receiving third user input indicating a first user interface of the plurality of user interfaces; and determining that the user interface data is associated with the first user interface;

wherein correspondence between the first user input and the user interface data is determined in response to the third user input.

13. A system comprising:

one or more memories storing computer-executable instructions; and one or more hardware processors to execute the computer-executable instructions to:

receive first user input, wherein the first user input includes: first criteria for causing presentation of a first user interface element; and first element characteristics for controlling one or more first characteristics of presentation of the first user interface element;

determine first correspondence between the first criteria and user interface data, wherein the user interface data associates each of a plurality of user interface elements with a respective one or more criteria, and the plurality of user interface elements include a second user interface element associated with second criteria;

based on the first correspondence, determine that the second criteria associated with the second user interface element correspond to the first criteria associated with the first user interface element included in the first user input, wherein the second user interface element is associated with second element characteristics for controlling one or more second characteristics of presentation of the second user interface element;

determine second correspondence between the first criteria associated with the first user input and the second criteria associated with the second user interface element;

determine third correspondence between the first element characteristics and the second element characteristics; and based on the second correspondence and the third correspondence, generate output indicative of the second user interface element, wherein the output indicates a conflict determination for contemporaneous presentation of the first user interface element and the second user interface elemental wherein the conflict determination indicates one or more of: at least a portion of the second criteria correspond to at least a portion of the first criteria, or at least a portion of the first element characteristics correspond to at least a portion of the second element characteristics.

14. The system of claim 13, further to execute the computer-executable instructions to:

include an indication of one or more of the second correspondence between the first criteria and the second criteria or the third correspondence between the first element characteristics and the second element characteristics in the output.

15. The system of claim 13, wherein the third correspondence between the first element characteristics and the second element characteristics indicates that at least a portion of the first user interface element and at least a portion of the second user interface element occupy a single location within a user interface.

16. The system of claim 13, wherein the third correspondence between the first element characteristics and the second element characteristics indicates that the first element characteristics and the second element characteristics relate to mutually exclusive properties of the first user interface element and the second user interface element.

17. The system of claim 14, further to execute the computer-executable instructions to:

determine a modification to one or more of the first criteria or the first element characteristics that resolves a conflict indicated by the conflict determination for contemporaneous presentation of the first user interface element and the second user interface element; and include an indication of the modification in the output.

18. The system of claim 13, further to execute the computer-executable instructions to:

receive second user input associating the first user interface element with a campaign associated with the plurality of user interface elements;

determine that a performance metric associated with the campaign exceeds a threshold performance metric; and in response to the performance metric exceeding the threshold performance metric, replace the second user interface element with the first user interface element.

19. The system of claim 13, further to execute the computer-executable instructions to:

determine that a first performance metric associated with the first user interface element is less than a threshold performance metric; and in response to the first performance metric being less than the threshold performance metric, initiate a workflow process to obtain approval for inclusion of the first user interface element in a user interface.

20. The system of claim 13, further to execute the computer-executable instructions to:

before receiving the first user input, receive second user input indicative of one or more of a source of the second user interface element or text indicating one or more of a goal or a reason associated with the second user interface element; and based on the second correspondence and the third correspondence, include, in the output, an indication of the one or more of the source or the text indicating the one or more of the goal or the reason.

* * * * *